United States Patent
Chan

(10) Patent No.: US 12,191,778 B2
(45) Date of Patent: Jan. 7, 2025

(54) POWER CONVERTER AND OPERATION METHOD THEREOF

(71) Applicant: Acer Incorporated, New Taipei (TW)

(72) Inventor: Tzu-Tseng Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 294 days.

(21) Appl. No.: 17/956,804

(22) Filed: Sep. 29, 2022

(65) Prior Publication Data

US 2023/0113954 A1  Apr. 13, 2023

(30) Foreign Application Priority Data

Oct. 7, 2021 (TW) .................................. 110137408

(51) Int. Cl.
| | | |
|---|---|---|
| *H02M 7/06* | (2006.01) | |
| *H02M 1/00* | (2006.01) | |
| *H02M 1/44* | (2007.01) | |

(52) U.S. Cl.
CPC ........... *H02M 7/06* (2013.01); *H02M 1/0009* (2021.05); *H02M 1/44* (2013.01)

(58) Field of Classification Search
CPC ......... H02M 7/06; H02M 1/0009; H02M 1/44
See application file for complete search history.

(56) References Cited

U.S. PATENT DOCUMENTS

| 10,491,131 B2 * | 11/2019 | Bhandarkar | ...... H02M 3/33592 |
| 2013/0127353 A1 * | 5/2013 | Athalye | .................. H05B 45/35 |
| | | | 315/193 |
| 2023/0113954 A1 * | 4/2023 | Chan | ..................... H02M 1/007 |
| | | | 363/44 |

FOREIGN PATENT DOCUMENTS

| TW | I499175 | 9/2015 |
| TW | 201918002 | 5/2019 |
| TW | 201918007 | 5/2019 |
| TW | 202008705 | 2/2020 |
| TW | 202011676 | 3/2020 |
| TW | 202034295 | 9/2020 |
| TW | 202036200 | 10/2020 |
| TW | 202038547 | 10/2020 |
| TW | 202038548 | 10/2020 |
| TW | 202041997 | 11/2020 |

* cited by examiner

*Primary Examiner* — Adolf D Berhane
(74) *Attorney, Agent, or Firm* — JCIPRNET

(57) ABSTRACT

A power converter and an operation method of the power converter are provided. The power converter includes a rectifier, a boost circuit, a current sensor, and a processor. The rectifier rectifies an AC power to generate a rectified power. The boost circuit includes a boost inductor. The boost circuit boosts the rectified power to generate an output power. The current sensor senses an inductor current value at the boost inductor to generate a sensed value corresponding to the inductor current value. The processor generates a first reference value according to an output voltage value of the output power, an input impedance value, and a first value. When the sensed value is greater than the first reference value, the processor enters a first operation mode to cause the sensed value to be not less than the first reference value.

17 Claims, 6 Drawing Sheets

POWER CONVERTER AND OPERATION METHOD THEREOF

CROSS-REFERENCE TO RELATED APPLICATION

This application claims the priority benefit of Taiwanese application no. 110137408, filed on Oct. 7, 2021. The entirety of the above-mentioned patent application is hereby incorporated by reference herein and made a part of this specification.

BACKGROUND

Technical Field

The disclosure relates to a power conversion field. Particularly, the disclosure relates to a power converter and an operation method capable of suppressing noise generated by an inductor current.

Description of Related Art

In the field of high-power applications, when a power converter performs boost conversion on an AC power, a drastically changing dynamic current may be generated. The drastic change of the dynamic current of a power supply may results in relatively drastic fluctuation of an inductor current of a boost inductor. The fluctuation frequency of the inductor current is within the auditory frequency range of the human ear. As such, a user may hear noise when the inductor current fluctuates relatively drastically, which thus lessens the user's experience. Therefore, how to suppress noise of the power converter is one of the research focuses of those skilled in the art.

SUMMARY

The disclosure provides a power converter and an operation method of a power converter, in which noise generated by an inductor current can be suppressed.

A power converter of the disclosure includes a rectifier, a boost circuit, a current sensor, and a processor. The rectifier rectifies an AC power at an input end to generate a rectified power. The boost circuit includes a boost inductor. The boost circuit boosts the rectified power to generate an output power. The current sensor senses an inductor current value at the boost inductor to generate a sensed value corresponding to the inductor current. The processor is coupled to the rectifier, the boost circuit, and the current sensor. The processor receives an input impedance value of the input end and an output voltage value of the output power, and generates a first reference value according to the output voltage value, the input impedance value, and a first value. When the sensed value is greater than the first reference value, the processor enters a first operation mode. In the first operation mode, the processor controls the boost circuit to cause the sensed value to be not less than the first reference value.

An operation method of the disclosure is adapted for a power converter. The power converter includes a rectifier and a boost circuit. The rectifier is configured to rectify an AC power at an input end to generate a rectified power. The boost circuit includes a boost inductor. The boost circuit is configured to boost the rectified power to generate an output power. The operation method includes the following. An inductor current value at the boost inductor is sensed to generate a sensed value corresponding to the inductor current value. An input impedance value of the input end and an output voltage value of the output power are received, and a first reference value is generated according to the output voltage value, the input impedance value, and a first value. When the sensed value is greater than the first reference value, a first operation mode is entered to control the boost circuit to cause the sensed value to be not less than the first reference value.

Based on the foregoing, the power converter generates the first reference value according to the output voltage value, the input impedance value, and the first value. Moreover, when the sensed value corresponding to the inductor current value is greater than the first reference value, the power converter enters the first operation mode to cause the sensed value to be not less than the first reference value. Therefore, the fluctuation of the inductor current value can be reduced. Accordingly, the power converter can suppress noise of the power converter.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
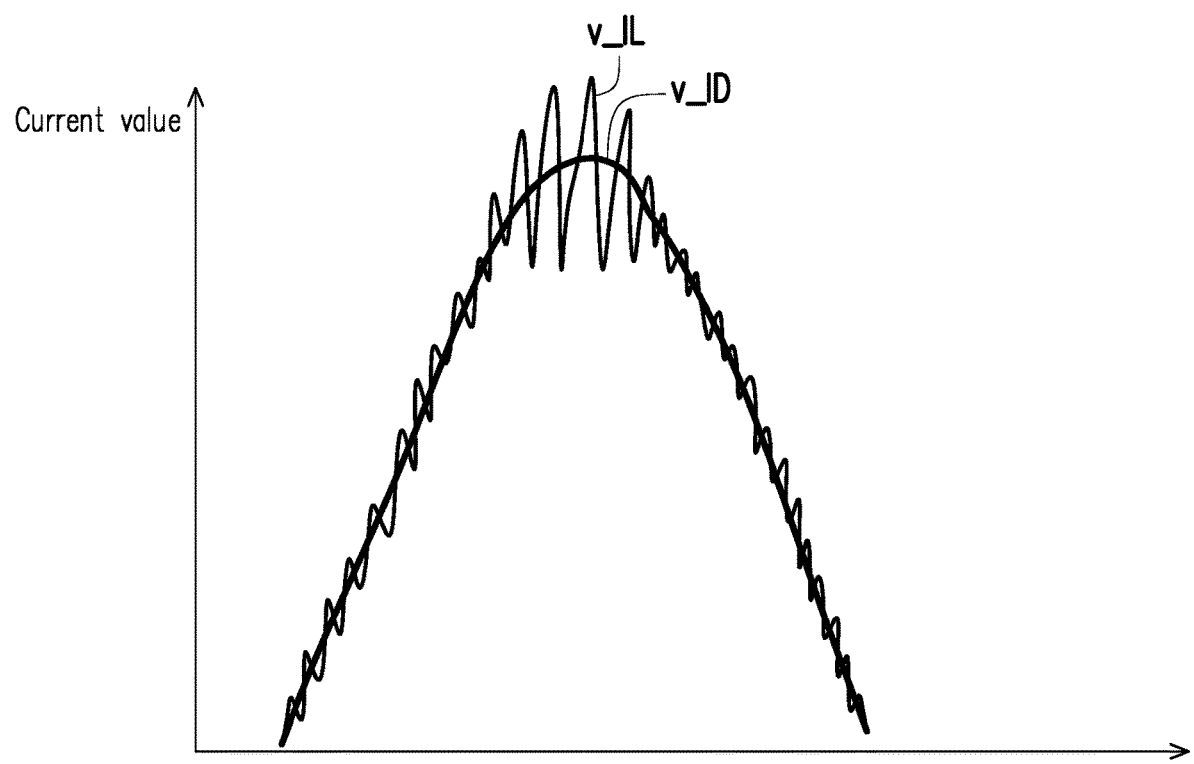
FIG. 1 is a schematic diagram of waveforms according to a dynamic current and an inductor current of an existing power converter in the field of high-power applications.

Some embodiments of the disclosure accompanied with the drawings will now be described in detail. In the reference numerals recited in description below, the same reference numerals shown in different drawings will be regarded as the same or similar elements. These embodiments are only a part of the disclosure and do not disclose all possible implementations of the disclosure. To be more precise, these embodiments are only examples of the appended claims of the disclosure.

With reference to FIG. 1, FIG. 1 is a schematic diagram of waveforms according to a dynamic current and an inductor current of an existing power converter in the field of high-power applications. In the field of high-power applications, when the existing power converter performs boost conversion on an AC power, a drastically changing dynamic current value v_ID may be generated. The drastic dynamic current value v_ID may directly affect the response of inductor current switching. As shown in FIG. 1, it can be found that an inductor current value v_IL has the most drastic fluctuation near the peak of the dynamic current value v_ID of a power supply. The vibration frequency generated by the fluctuation of the inductor current value v_IL is within the auditory frequency range of the human ear. As such, a user may hear noise when the inductor current value v_IL fluctuates relatively drastically.

In this disclosure, the fluctuation of the inductor current is suppressed near the peak of the dynamic current, thus suppressing noise.

Figure 2:
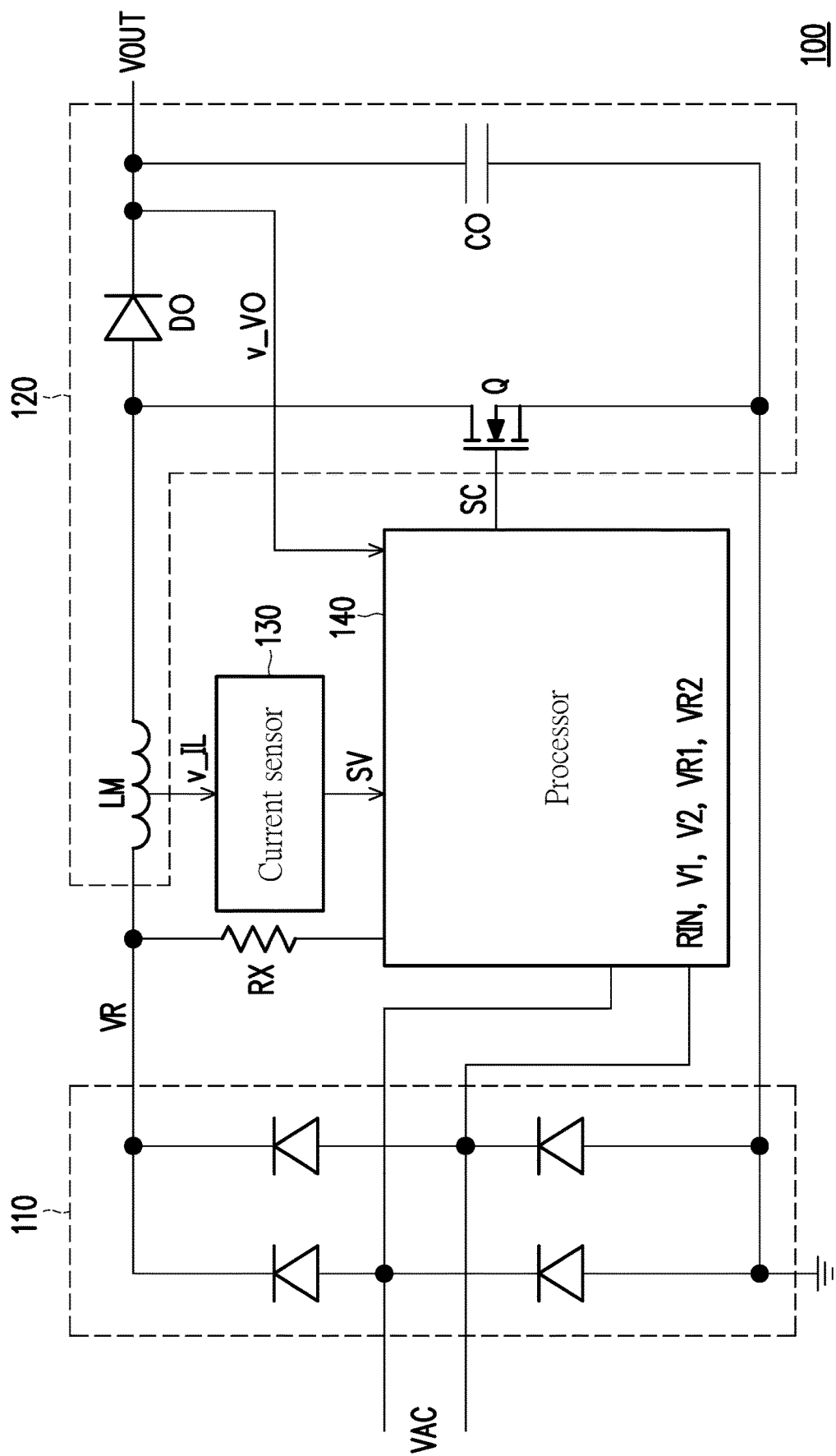
FIG. 2 is a schematic diagram of a power converter according to an embodiment of the disclosure.
Figure 3:
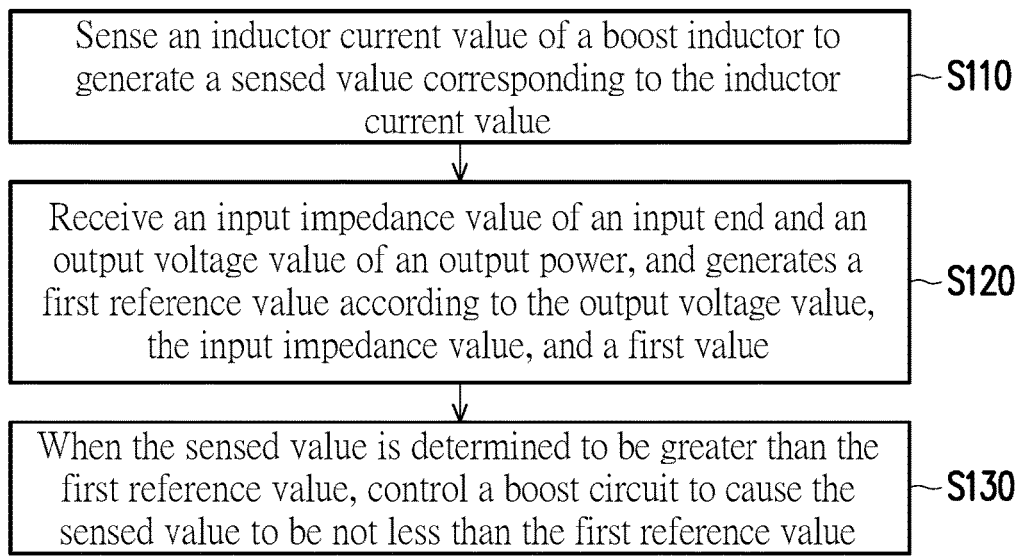
FIG. 3 is a flowchart of an operation method according to an embodiment of the disclosure.

With reference to FIG. 2 and FIG. 3 together, FIG. 2 is a schematic diagram of a power converter according to an embodiment of the disclosure, and FIG. 3 is a flowchart of an operation method according to an embodiment of the disclosure. In this embodiment, a power converter 100 includes a rectifier 110, a boost circuit 120, a current sensor 130, and a processor 140. The rectifier 110 rectifies an AC power VAC at an input end to generate a rectified power VR. The current value of the rectified power VR is the dynamic current value v_ID. The rectifier 110 of this embodiment may be a bridge rectifier. In this embodiment, the boost circuit 120 includes a boost inductor LM. The boost circuit 120 boosts the rectified power VR to generate an output power VOUT.

The boost circuit 120 may be a circuit with a power factor correction (PFC) function. For example, the boost circuit 120 also includes a power switch Q, a diode DO, and a capacitor CO (but the disclosure is not limited thereto). The boost inductor LM is coupled between an anode of the diode DO and the rectifier 110. A first end of the power switch Q is coupled to the anode of the diode DO. A second end of the power switch Q is coupled to a reference low voltage (e.g., a ground). A control end of the power switch Q receives a control signal SC. Turning on or off the power switch Q determines the inductor current value v_IL of the boost inductor LM. A first end of the capacitor CO is coupled to a cathode of the diode DO. A second end of the capacitor CO is coupled to the reference low voltage. The first end of the capacitor CO serves as an output end of the boost circuit 120.

In this embodiment, the current sensor 130 senses the inductor current value v_IL of the boost inductor LM to generate a sensed value SV corresponding to the inductor current value v_IL in step S110. The base value of the inductor current value v_IL may fluctuate along with the dynamic current value v_ID. The inductor current value v_IL may fluctuate in response to the operation of the power switch Q. It should be noted that the fluctuation of the sensed value SV may directly reflect the fluctuation of the inductor current value v_IL. For example, the sensed value SV is substantially equal to the inductor current value v_IL.

The processor 140 is coupled to the rectifier 110, the boost circuit 120, and the current sensor 130. In step S120, the processor 140 receives an input impedance value RIN of the input end and an output voltage value v_VO of an output power VOUT, and the processor 140 generates a first reference value VR1 according to the output voltage value v_VO, the input impedance value RIN, and a first value V1. The processor 140 determines whether the sensed value SV is greater than the first reference value VR1. In step S130, when the sensed value SV is determined to be greater than the first reference value VR1, the processor 140 enters a first operation mode. In this embodiment, in the first operation mode, the processor 140 controls the boost circuit 120 to cause the sensed value SV to be not less than the first reference value VR1. Therefore, the drastic fluctuation of the inductor current value v_IL can be reduced. Accordingly, the power converter 100 can suppress noise of the power converter.

Figure 4:
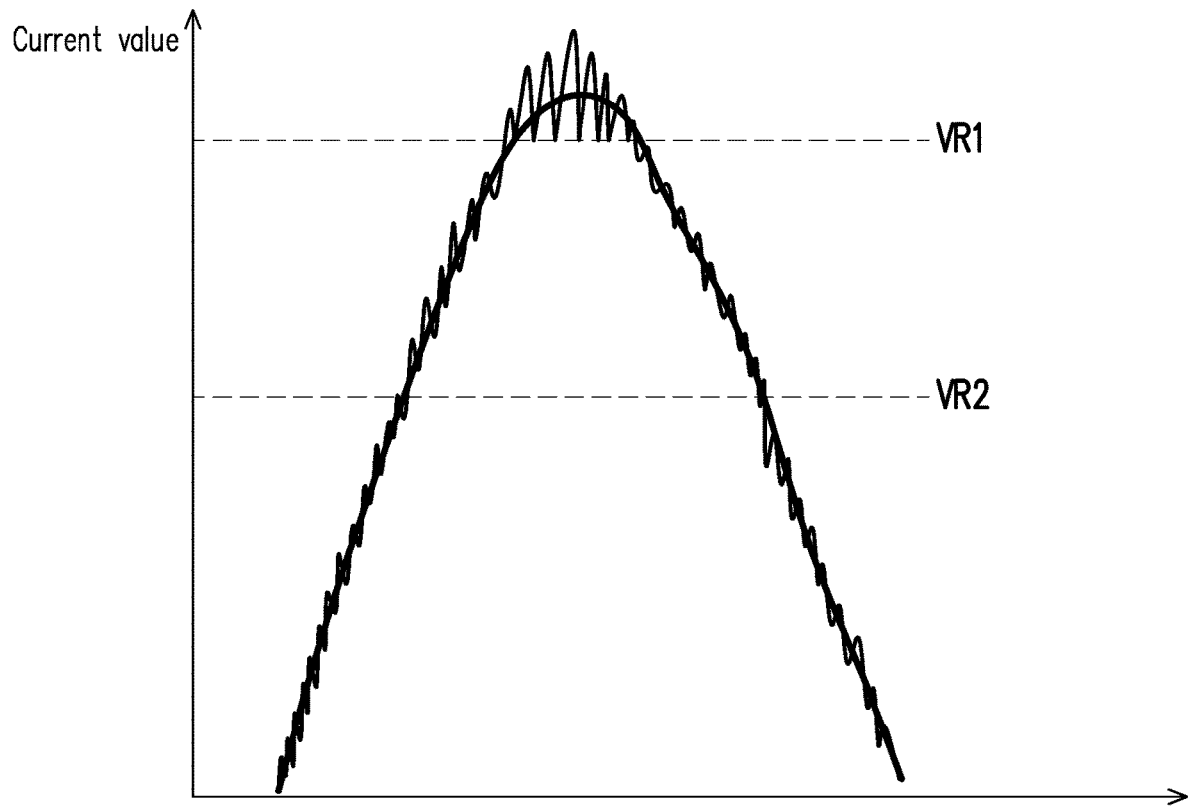
FIG. 4 is a schematic diagram of waveforms of a current of a power converter according to an embodiment of the disclosure.

With reference to FIG. 2 and FIG. 4 together, FIG. 4 is a schematic diagram of waveforms of a current of a power converter according to an embodiment of the disclosure. In this embodiment, the first reference value VR1 may be obtained according to Formula (1):

$$VR1 = v\_VO/(V1 \times RIN) \qquad \text{Formula (1)}$$

In other words, the processor 140 divides the output voltage value v_VO by a product of the first value V1 and the input impedance value RIN to generate the first reference value VR1. In this embodiment, the first value V1 may be set so that the first reference value VR1 is close to the peak value corresponding to the dynamic current value v_ID. The first reference value VR1 is, for example, 95% of the peak value (but the disclosure is not limited thereto). In this embodiment, the first value V1 is, for example, equal to 4 (but the disclosure is not limited thereto).

In this embodiment, the processor 140 may provide the control signal SC with a first switching frequency in the first operation mode, and use the control signal SC with the first switching frequency to control the power switch Q. The first switching frequency is, for example, 35 kHz (but the disclosure is not limited thereto). In addition, when the sensed value SV drops to be equal to the first reference value VR1 in the first operation mode, the processor 140 turns on the power switch Q. As a result, the inductor current value v_IL rises, and the sensed value SV also rises. Therefore, the fluctuation of the inductor current value v_IL can be limited by the first reference value VR1.

In this embodiment, the processor 140 generates a second reference value VR2 according to the output voltage value v_VO, the input impedance value RIN, and a second value V2. In this embodiment, the second reference value VR2 may be obtained according to Formula (2):

$$VR2 = v\_VO/(V2 \times RIN) \qquad \text{Formula (2)}$$

The processor 140 divides the output voltage value v_VO by a product of the second value V2 and the input impedance value RIN to generate the second reference value VR2. The second value V2 is greater than the first value V1. Therefore, the second reference value VR2 is less than the first reference value VR1.

In this embodiment, the second value V2 may be set so that the second reference value VR2 is substantially equal to the upper limit value under light load of the dynamic current value v_ID. In this embodiment, the second value V2 is, for example, 5.5 (but the disclosure is not limited thereto).

In a case where the sensed value SV is less than or equal to the first reference value VR1, the processor 140 may further determine whether the sensed value SV is greater than the second reference value VR2. When the sensed value SV is determined to be greater than the second reference value VR2 and less than or equal to the first reference value VR1, the processor 140 enters a second operation mode. The processor 140 may provide the control signal SC with a second switching frequency in the second operation mode, and use the control signal SC with the second switching frequency to control the power switch Q. The processor 140 controls the boost circuit 120 based on the second switching frequency to prevent generation of electromagnetic interference in the power converter 100. In this embodiment, the second frequency is, for example, 35 kHz (but the disclosure is not limited thereto).

When the sensed value SV is determined to be less than or equal to the second reference value VR2, the processor 140 enters a third operation mode. In the third operation mode, the processor 140 controls the boost circuit based on a frequency range to maintain the optimal efficiency of the power converter under light load. The frequency range may be 65 kHz to 85 kHz, for example.

In this embodiment, the processor 140 may also determine whether a variation frequency of the inductor current value v_IL is abnormal. Specifically, the processor 140 may be coupled to the boost inductor LM through a resistor RX to sense the actual variation frequency of the inductor current value v_IL. When the variation frequency of the inductor current value v_IL obviously does not match the logic level of the control signal SC or the on/off state of the power switch Q, the processor 140 determines that the variation frequency of the inductor current value v_IL is abnormal. In addition, when the variation frequency of the inductor current value v_IL generally matches the logic level of the control signal SC or the on/off state of the power switch Q, the processor 140 determines that the variation frequency of the inductor current value v_IL is not abnormal. In this embodiment, the resistor RX is configured to serve as a protective resistor to prevent the processor 140 from damage from the dynamic current value v_ID.

Figure 5:
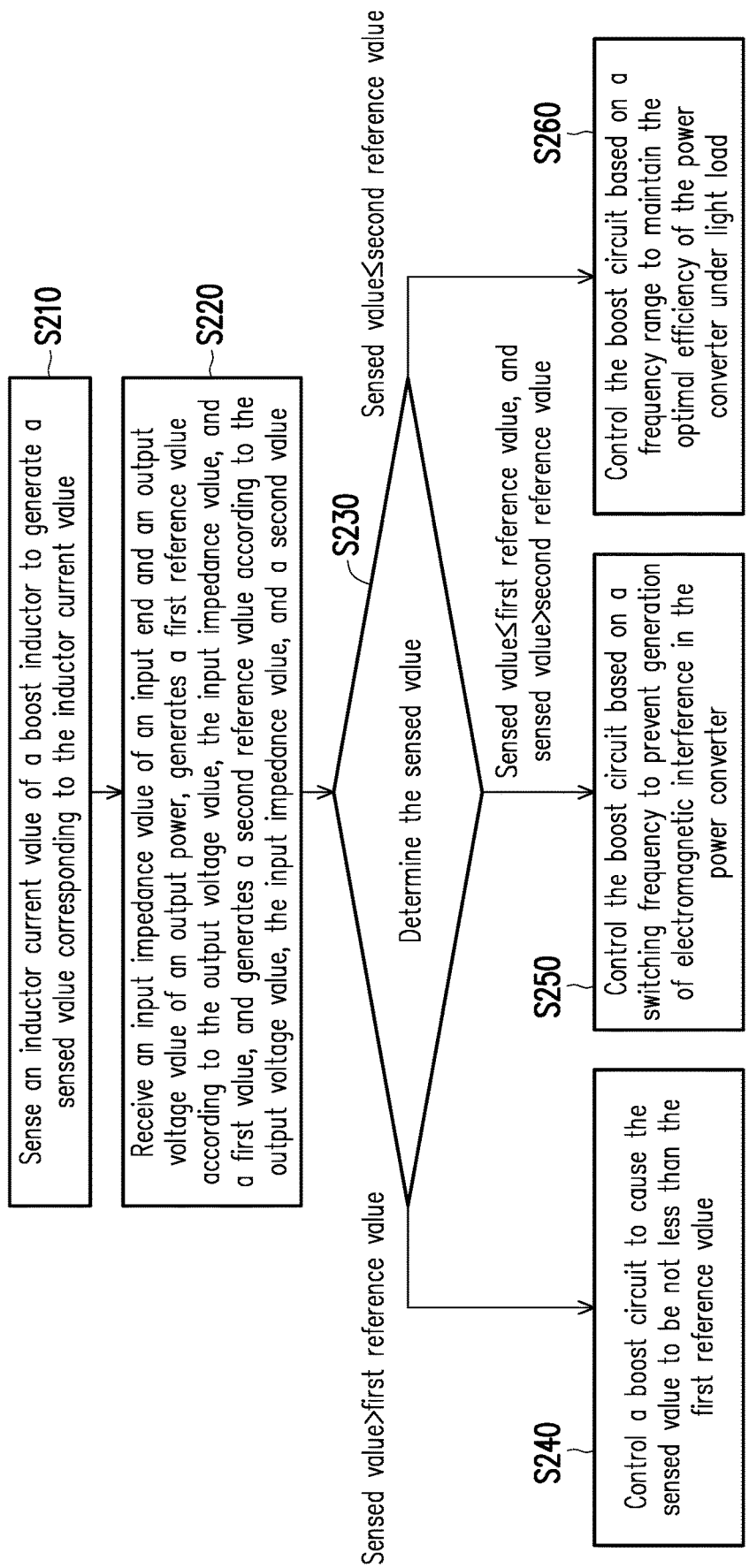
FIG. 5 is a flowchart of another operation method according to an embodiment of the disclosure.

With reference to FIG. 2 and FIG. 5 together, FIG. 5 is a flowchart of another operation method according to an embodiment of the disclosure. In this embodiment, the current sensor 130 senses the inductor current value v_IL of the boost inductor LM to generate the sensed value SV corresponding to the inductor current value v_IL in step S210. In step S220, the processor 140 receives the input impedance value RIN of the input end and the output voltage value v_VO of the output power VOUT, the processor 140 generates the first reference value VR1 according to the output voltage value v_VO, the input impedance value RIN, and the first value V1, and the processor 140 also generates the second reference value VR2 according to the output voltage value v_VO, the input impedance value RIN, and the second value V2. In step S230, the processor 140 determines the sensed value SV. When the sensed value SV is determined to be greater than the first reference value VR1 in step S230, it means that the current value (v_ID as shown in FIG. 1) of the dynamic current entering the boost inductor LM is greater than the first reference value VR1. In other words, the current value of the dynamic current is near the peak, and thus the inductor current value v_IL is greater than the first reference value VR1. As a result, the processor 140 enters the first operation mode in step S240. In the first operation mode, the processor 140 controls the boost circuit 120 to cause the sensed value SV to be not less than the first reference value VR1. Therefore, the fluctuation of the inductor current value v_IL can be reduced. Accordingly, the power converter 100 can suppress noise of the power converter.

When the sensed value SV is determined to be less than or equal to the first reference value VR1 and greater than the second reference value VR2 in step S230, it means that the current value of the dynamic current causes the inductor current value v_IL to be between the first reference value VR1 and the second reference value VR2. As a result, the processor 140 enters the second operation mode in step S250. In the second operation mode, the processor 140 controls the boost circuit 120 based on a switching frequency to prevent generation of electromagnetic interference in the power converter 100.

When the sensed value SV is determined to be less than or equal to the second reference value VR2 in step S230, it means that the current value of the dynamic current causes the inductor current value v_IL to be less than or equal to the second reference value VR2. As a result, the processor 140 enters the third operation mode in step S260. In the third operation mode, the processor 140 controls the boost circuit 120 based on the frequency range to maintain the optimal efficiency of the power converter 100 under light load.

Figure 6:
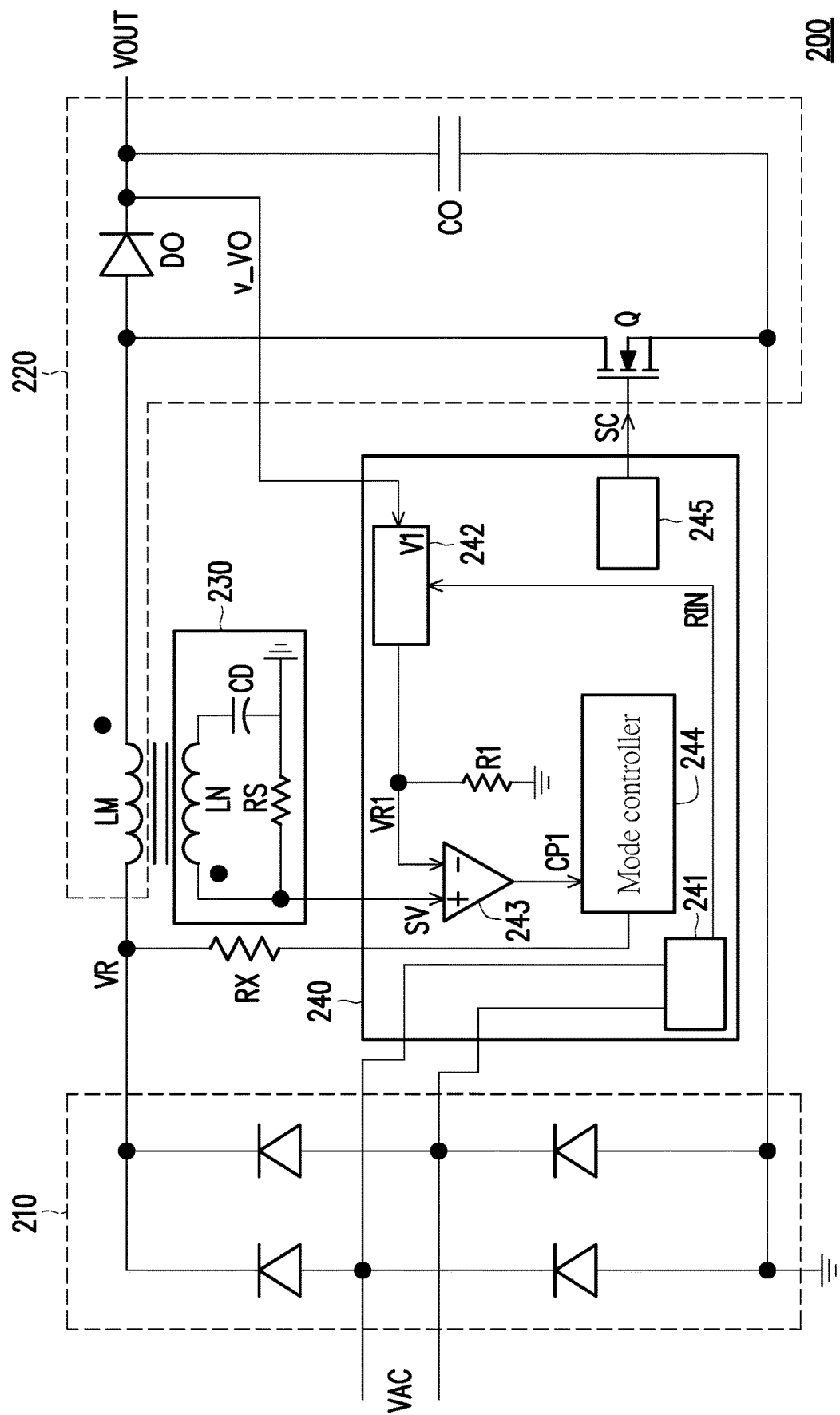
FIG. 6 is a schematic circuit block diagram of a power converter according to an embodiment of the disclosure.

Examples will provided to describe the implementation details of the current sensor and the processor. With reference to FIG. 6, FIG. 6 is a schematic circuit block diagram of a power converter according to an embodiment of the disclosure. In this embodiment, a power converter 200 includes a rectifier 210, a boost circuit 220, a current sensor 230, and a processor 240. The current sensor 230 includes a coupled inductor LN, a sensing resistor RS, and a discharging capacitor CD. The coupled inductor LN and the boost inductor LM are inductively coupled to induce the inductor current value v_IL. For example, the boost inductor LM, the coupled inductor LN, and a magnetic element (e.g., an iron core) may form an inductive coupling circuit. Nonetheless, the disclosure is not limited thereto. A first end of the sensing resistor RS is coupled to a first end of the coupled inductor LN. A second end of the sensing resistor RS is coupled to a reference low voltage. The sensing resistor RS is configured to determine the numerical relationships between the sensed value SV and the inductor current value v_IL. The sensing resistor RS of this embodiment may have a resistance value of 1Ω (but the disclosure is not limited thereto). As such, the value of the sensed value SV is substantially equal to the value of the inductor current value v_IL. A first end of the discharging capacitor CD is coupled to a second end of the coupled inductor LN. A second end of the discharging capacitor CD is coupled to the second end of the sensing resistor RS. The discharging capacitor CD serves as an energy discharge path for the sensing resistor RS and the coupled inductor LN. Accordingly, the current sensor 230 may have a faster response speed, so that the sensed value SV can reflect the fluctuation of the inductor current value v_IL in real-time.

In this embodiment, the processor 240 includes an input impedance sensor 241, a calculator 242, a comparator 243, a mode controller 244, and a driver 245. The input impedance sensor 241 senses the real-time input impedance value RIN. The calculator 242 is coupled to the input impedance sensor 241. The calculator 242 receives the output voltage value v_VO, and based on Formula (1), multiplies the input impedance value RIN and the first value V1 to produce the first product and divides the output voltage value v_VO by the first product to generate the first reference value VR1. In some embodiments, the calculator 242 may be implemented at least by a divider. The divider may divide the output voltage value v_VO by the input impedance value RIN and then by the first value V1 to generate the first reference value VR1.

Further, the resistor R1 may be set between the calculator 242 and a reference low voltage. The resistor R1 may be configured to determine the voltage value corresponding to the first reference value VR1.

In this embodiment, the comparator 243 is coupled to the calculator 242 and the current sensor 230. The comparator 243 compares the sensed value SV with the first reference value VR1 to generate a first comparison result CP1. In this embodiment, a non-inverting input end of the comparator 243 is coupled to the current sensor 230, an inverting input end of the comparator 243 is coupled to the calculator 242, and an output end of the comparator 243 is coupled to the mode controller 244.

In this embodiment, the mode controller 244 is coupled to the comparator 243. The mode controller 244 receives the first comparison result CP1. When the first comparison result CP1 indicates that the sensed value SV is greater than the first reference value VR1, the mode controller 244 controls the processor 240 to enter the first operation mode. In this embodiment, when the first comparison result CP1 indicates that the sensed value SV is greater than the first reference value VR1, the comparator 243 outputs the first comparison result CP1 at a high voltage level, and the mode controller 244 controls the processor 240 to enter the first operation mode. In addition, when the first comparison result CP1 indicates that the sensed value SV is less than or equal to the first reference value VR1, the comparator 243 outputs the first comparison result CP1 at a low voltage level, and the mode controller 244 does not control the processor 240 to enter the first operation mode.

In this embodiment, the driver 245 provides the control signal SC in the first operation mode to control the boost circuit 220 to cause the sensed value SV to be not less than the first reference value VR1. In some embodiments, the mode controller 244 may directly control the driver 245 to provide the control signal SC.

Figure 7:
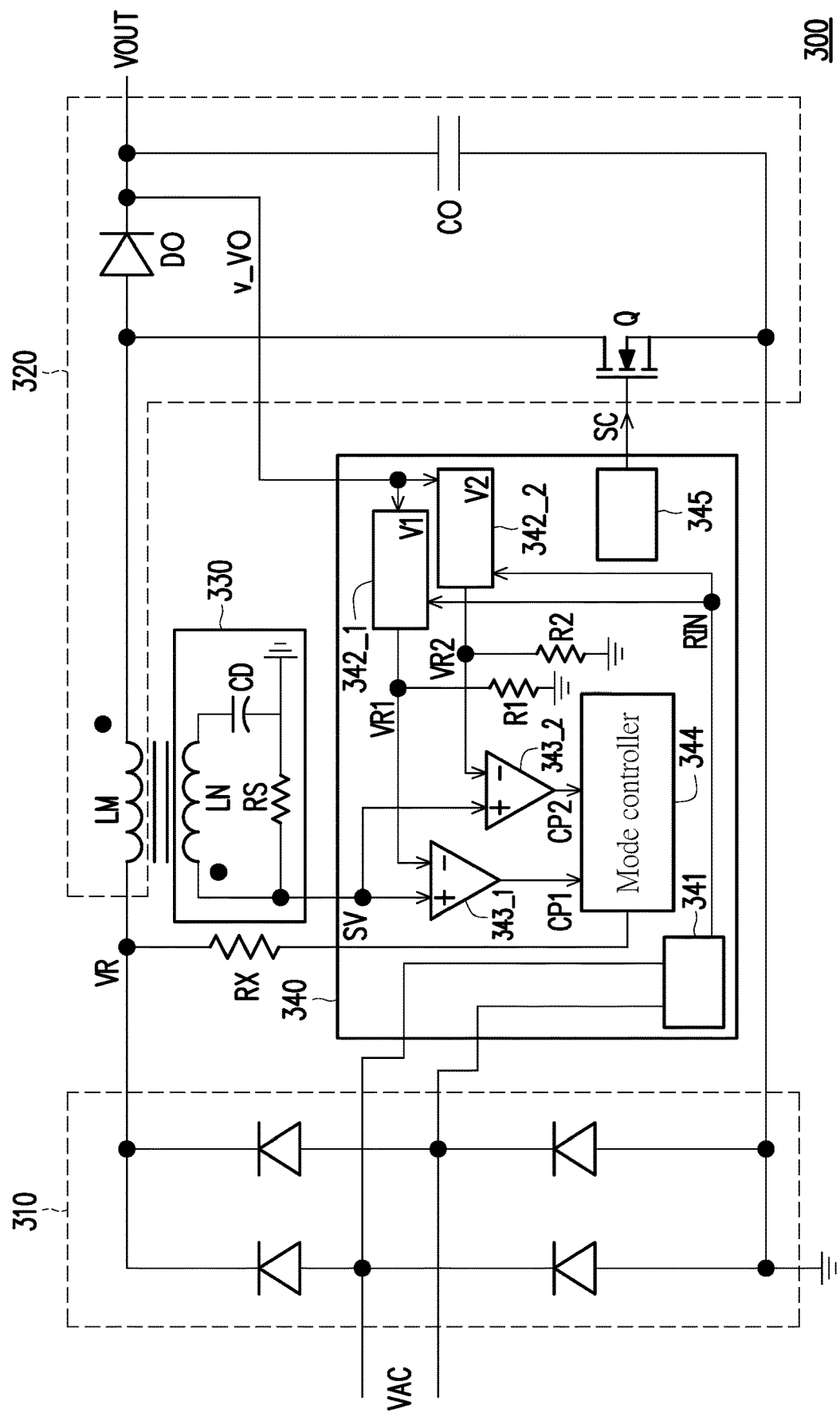
FIG. 7 is another schematic circuit block diagram of a power converter according to an embodiment of the disclosure.

Other examples will be provided to describe the implementation details of the processor. With reference to FIG. 7, FIG. 7 is another schematic circuit block diagram of a power converter according to an embodiment of the disclosure. In this embodiment, a power converter 300 includes a rectifier 310, a boost circuit 320, a current sensor 330, and a processor 340. The circuit configuration of the current sensor 330 may be sufficiently taught from the embodiment of FIG. 6, which will not be repeatedly described herein. The processor 340 includes an impedance sensor 341, calculators 342_1, 342_2, comparators 343_1, 343_2, a mode controller 344, and a driver 345. For the implementation of the impedance sensor 341, the calculator 342_1, and the comparator 343_1, reference may be made to the implementation of the impedance sensor 241, the calculator 242, and the comparator 243 of the embodiment of FIG. 6, which thus will not be repeatedly described herein.

In this embodiment, the calculator 342_2 receives the output voltage value v_VO, and based on Formula (2), multiplies the input impedance value RIN and the second value V2 to produce the second product and divides the output voltage value v_VO by the second product to generate the second reference value VR2. In some embodiments, the calculator 342_2 may be implemented at least by a divider. The divider may divide the output voltage value v_VO by the input impedance value RIN and then by the second value V2 to generate the second reference value VR2.

Further, the resistor R2 may be set between the calculator 342_2 and a reference low voltage. The resistor R2 may be configured to determine the voltage value corresponding to the second reference value VR2.

In this embodiment, the comparator 343_2 is coupled to the calculator 342_2 and the current sensor 330. The comparator 343_2 compares the sensed value SV with the second reference value VR2 to generate a second comparison result CP2. In this embodiment, a non-inverting input end of the comparator 343_2 is coupled to the current sensor 330, an inverting input end of the comparator 343_2 is coupled to the calculator 342_2, and an output end of the comparator 343_2 is coupled to the mode controller 344. When the second comparison result CP2 indicates that the sensed value SV is greater than the second reference value VR2, the comparator 343_2 outputs the second comparison result CP2 at a high voltage level. When the second comparison result CP2 indicates that the sensed value SV is less than or equal to the second reference value VR2, the comparator 343_2 outputs the second comparison result CP2 at a low voltage level.

In this embodiment, the mode controller 344 receives the first comparison result CP1 and the second comparison result CP2, and determines the operation mode according to Table 1.

TABLE 1

| First comparison result | Second comparison result | Operation mode |
|---|---|---|
| High voltage level | High voltage level | First operation mode |
| Low voltage level | High voltage level | Second operation mode |
| Low voltage level | Low voltage level | Third operation mode |

In other words, when the first comparison result CP1 indicates that the sensed value SV is greater than the first reference value VR1, the mode controller 344 controls the processor 340 to enter the first operation mode. When the first comparison result CP1 indicates that the sensed value SV is less than or equal to the first reference value VR1 and the second comparison result CP2 indicates that the sensed value SV is greater than the second reference value VR2, the mode controller 344 controls the processor 340 to enter the second operation mode. When the second comparison result CP2 indicates that the sensed value SV is less than or equal to the second reference value VR2, the mode controller 344 controls the processor 340 to enter the third operation mode.

In summary of the foregoing, the power converter generates the first reference value according to the output voltage value, the input impedance value, and the first value. Moreover, when the sensed value corresponding to the inductor current value is greater than the first reference value, the power converter enters the first operation mode to cause the sensed value to be not less than the first reference value. The fluctuation of the inductor current value can be reduced because of the limitation of the first reference value. Accordingly, the power converter can suppress noise of the power converter.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power converter, comprising:
   a rectifier, configured to rectify an AC power at an input end to generate a rectified power;
   a boost circuit, comprising a boost inductor and being configured to boost the rectified power to generate an output power;
   a current sensor, configured to sense an inductor current value at the boost inductor to generate a sensed value corresponding to the inductor current value; and
   a processor, coupled to the rectifier, the boost circuit, and the current sensor and configured to receive an input impedance value of the input end and an output voltage value of the output power, generate a first reference value according to the output voltage value, the input impedance value, and a first value, and enter a first operation mode when the sensed value is greater than the first reference value, wherein, in the first operation mode, the processor controls the boost circuit to cause the sensed value to be not less than the first reference value.

2. The power converter according to claim 1, wherein the boost circuit further comprises a power switch, and in the first operation mode, when the sensed value drops to be equal to the first reference value, the processor turns on the power switch to increase the inductor current value.

3. The power converter according to claim 1, wherein the processor further generates a second reference value according to the output voltage value, the input impedance value, and a second value, and the second value is greater than the first value.

4. The power converter according to claim 3, wherein when the sensed value is greater than the second reference value and less than or equal to the first reference value, the processor enters a second operation mode, and in the second operation mode, the processor controls the boost circuit based on a switching frequency to prevent a generation of an electromagnetic interference in the power converter.

5. The power converter according to claim 4, wherein when the sensed value is less than or equal to the second reference value, the processor enters a third operation mode, and in the third operation mode, the processor controls the boost circuit based on a frequency range to maintain an optimal efficiency of the power converter under a light load.

6. The power converter according to claim 5, wherein the processor comprises:

an input impedance sensor, configured to sense the input impedance value;

a first calculator, coupled to the input impedance sensor and configured to receive the output voltage value, multiply the input impedance value and the first value to produce a first product, and divide the output voltage value by the first product to generate the first reference value;

a first comparator, coupled to the first calculator and the current sensor and configured to compare the sensed value with the first reference value to generate a first comparison result; and a mode controller, coupled to the first comparator and configured to control the processor to enter the first operation mode when the first comparison result indicates that the sensed value is greater than the first reference value.

7. The power converter according to claim 6, wherein the processor comprises:

a second calculator, coupled to the input impedance sensor and configured to receive the output voltage value, multiply the input impedance value and the second value to produce a second product, and divide the output voltage value by the second product to generate the second reference value; and a second comparator, coupled to the second calculator, the current sensor, and the mode controller and configured to compare the sensed value with the second reference value to generate a second comparison result.

8. The power converter according to claim 7, wherein when the first comparison result indicates that the sensed value is less than or equal to the first reference value and the second comparison result indicates that the sensed value is greater than the second reference value, the mode controller controls the processor to enter the second operation mode.

9. The power converter according to claim 7, wherein when the second comparison result indicates that the sensed value is less than or equal to the second reference value, the mode controller controls the processor to enter the third operation mode.

10. The power converter according to claim 6, wherein the boost circuit further comprises a power switch, and the processor further comprises:

a control signal generator, providing a corresponding control signal in response to one of the first operation mode, the second operation mode, and the third operation mode and using the control signal to control the power switch to be turned on and turned off.

11. The power converter according to claim 1, wherein the processor is further configured to determine whether a variation frequency of the inductor current value is abnormal.

12. The power converter according to claim 1, wherein the current sensor comprises:

a coupled inductor, coupled to the boost inductor to sense the inductor current value;

a sensing resistor, wherein a first end of the sensing resistor is coupled to a first end of the coupled inductor and a second end of the sensing resistor is coupled to a reference low voltage; and a discharging capacitor, wherein a first end of the discharging capacitor is coupled to a second end of the coupled inductor, and a second end of the discharging capacitor is coupled to the second end of the sensing resistor.

13. An operation method adapted for a power converter, wherein the power converter comprises a rectifier and a boost circuit, the rectifier is configured to rectify an AC power at an input end to generate a rectified power, the boost circuit comprises a boost inductor, the boost circuit is configured to boost the rectified power to generate an output power, and the operation method comprises:

sensing an inductor current value at the boost inductor to generate a sensed value corresponding to the inductor current value;

receiving an input impedance value of the input end and an output voltage value of the output power, and generating a first reference value according to the output voltage value, the input impedance value, and a first value; and when the sensed value is greater than the first reference value, entering a first operation mode to control the boost circuit to cause the sensed value to be not less than the first reference value.

14. The operation method according to claim 13, wherein the boost circuit further comprises a power switch, and entering the first operation mode to control the boost circuit to cause the sensed value to be not less than the first reference value comprises:

when the sensed value drops to be equal to the first reference value, turning on the power switch to increase the inductor current value.

15. The operation method according to claim 13, wherein receiving the input impedance value of the input end and the output voltage value of the output power, and generating the first reference value according to the output voltage value, the input impedance value, and the first value comprises:

generating a second reference value according to the output voltage value, the input impedance value, and a second value, wherein the second value is greater than the first value.

16. The operation method according to claim 15, further comprising:

when the sensed value is greater than the second reference value and less than or equal to the first reference value, entering a second operation mode to control the boost circuit based on a switching frequency to prevent a generation of an electromagnetic interference in the power converter.

17. The operation method according to claim 16, further comprising:

when the sensed value is less than or equal to the second reference value, entering a third operation mode to control the boost circuit based on a frequency range to maintain an optimal efficiency of the power converter under a light load.

* * * * *